L. E. KRICHBAUM.
RESILIENT TIRE.
APPLICATION FILED OCT. 22, 1915.

1,190,914.

Patented July 11, 1916.
2 SHEETS—SHEET 1.

Witnesses
Helen Meeks
Agnes A. Johnston.

Inventor
Louis E. Krichbaum
By W. C. Carman, Attorney

L. E. KRICHBAUM.
RESILIENT TIRE.
APPLICATION FILED OCT. 22, 1915.
1,190,914.
Patented July 11, 1916.
2 SHEETS—SHEET 2.
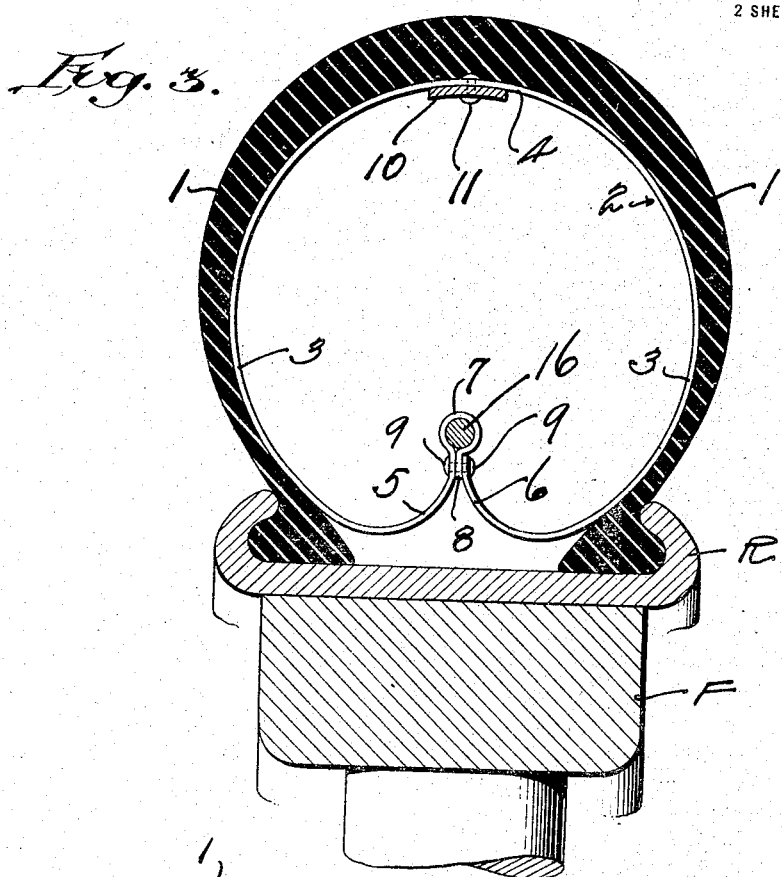
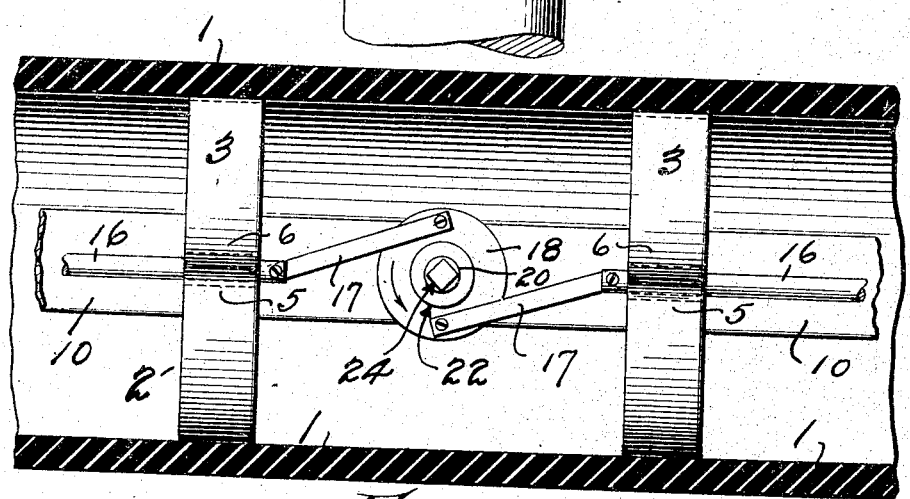

UNITED STATES PATENT OFFICE.

LOUIS E. KRICHBAUM, OF YOUNGSTOWN, OHIO.

RESILIENT TIRE.

1,190,914.  Specification of Letters Patent.  Patented July 11, 1916.

Application filed October 22, 1915. Serial No. 57,292.

*To all whom it may concern:*

Be it known that I, LOUIS E. KRICHBAUM, a citizen of the United States, residing at Youngstown, in the county of Mahoning and State of Ohio, have invented certain new and useful Improvements in Resilient Tires, of which the following is a specification.

This invention relates to resilient tires, and more particularly to tires of the type which include an internal metallic spring cushion.

To this end the invention primarily contemplates a skeleton-like resilient member readily insertible as a core unit within the ordinary outer shoe or casing, and providing a cushion of a maximum resiliency and stability, thus increasing the tractive efficiency of the tire, and closely simulating the characteristic features of the standard pneumatic tire.

Another object of the invention is to provide an expansible resilient core adaptable to casings or shoes of varying diameter. Thus, the core of the present invention is available as a substitute for the usual inflatable inner tube, and performs the functions thereof in a practical and efficient manner without the danger of punctures or blow-outs common thereto.

A further object of the invention is to provide a resilient tire involving an outer rubber or equivalent shoe, and an internal resilient core that may be handled in the conventional way, that is, in the manner of the ordinary pneumatic tires which are carried upon clencher or demountable rims. In this connection, it may be noted that the invention also contemplates an adjustment for the spring or cushion core, whereby, after the tire is fitted to the wheel, it may be expanded by manipulating an exposed adjusting member with a wrench or other tool, thus making it easy to initially fit the tire to the wheel, and then cause it to expand in substantially the same way that air does as it inflates the usual inner tube.

With the above and other objects in view which will more readily appear as the nature of the invention is better understood, the same consists in the novel construction, combination and arrangement of parts hereinafter more fully described, illustrated and claimed.

A preferred and practical embodiment of the present invention is illustrated in the accompanying drawings, in which—

Figure 1:
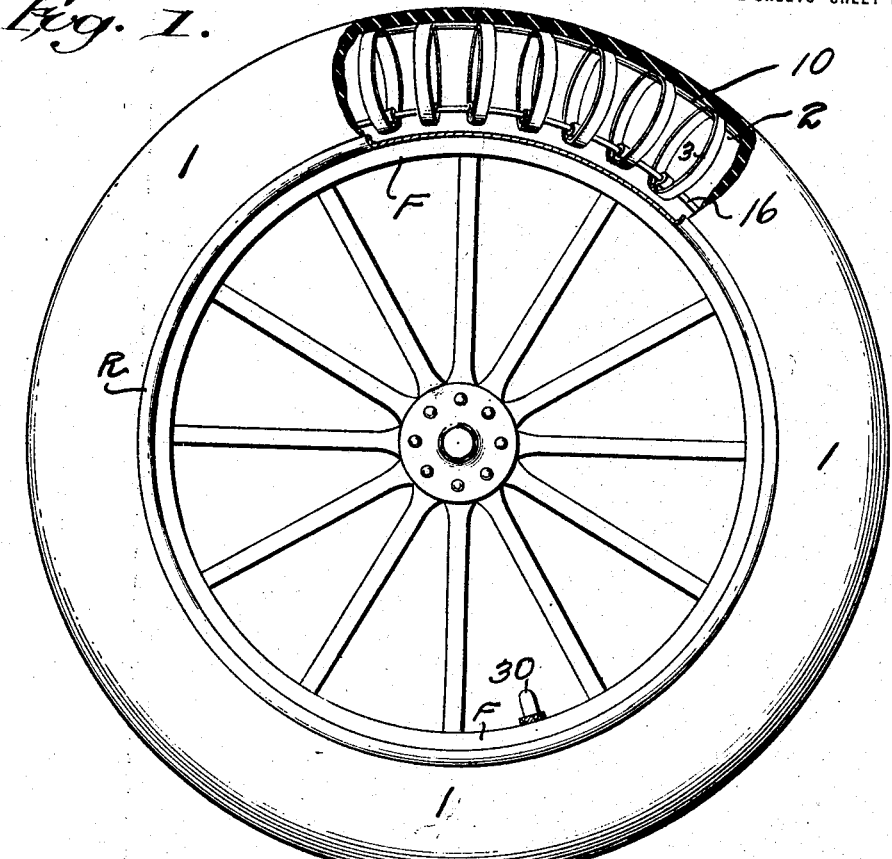
Figure 2:
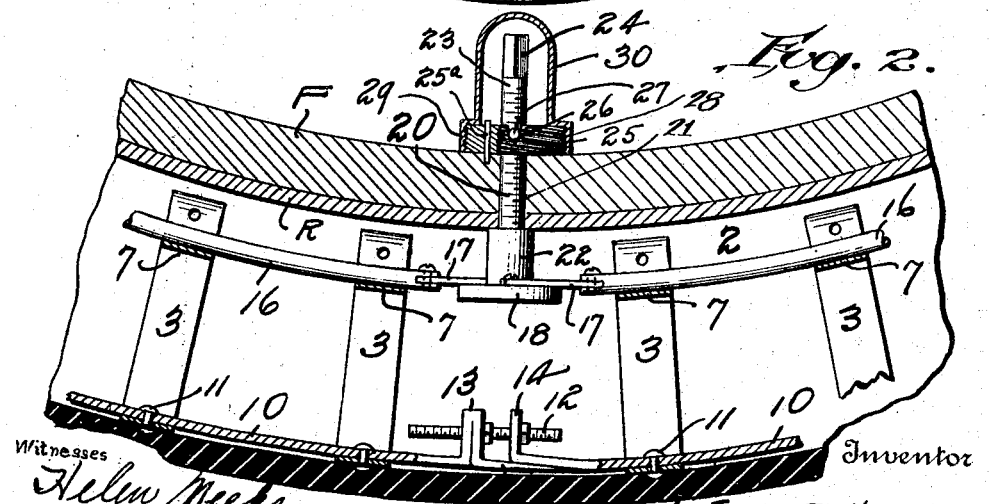

Figure 1 is an elevation of a wheel having my improved tire thereon, the latter being shown partly in section to illustrate the character of the spring core within the same. Fig. 2 is an enlarged detail sectional view, showing the means for expanding and adjusting the spring core. Fig. 3 is a transverse cross section. Fig. 4 is an enlarged detail sectional view, showing in plan the tension device for effecting the expansion of the core unit.

Similar reference characters designate corresponding parts throughout the several figures of the drawings.

In carrying forward the invention, the outer casing may be of any standard or accepted type, and is generally designated in the drawings by the numeral 1. This casing receives the device of the present invention, namely the spring core unit designated by the reference numeral 2, primarily comprising a plurality of spaced radially disposed cushion springs 3 in substantially the form of rings. These springs or spring rings are disposed transversely of the tire casing in spaced relation to form a circular series of spring supporting elements for the casing. By reference to Figs. 1 and 3, it will be observed that each of these spring members 3 while of a ring-type is more nearly of a substantially heart-shaped formation. That is to say, they are formed from a flat strip of spring metal bent or bowed to provide an arched portion 4 for supporting the tread section of the tire casing, while the free end portions 5 and 6 thereof are introverted and united as clearly shown in Fig. 3. In the illustrated form of construction, the introverted terminal portion 5, is formed with an eye 7, while the extreme end 8 is bent toward the body of the strip, and connected with the terminal 6 by means of the rivet or equivalent fastening 9.

For the purpose of holding the ring-like spring members 3 in proper spaced relation, the same are connected at the crown of their arched portions 4 by a circumferential holding strip 10, riveted or otherwise rigidly secured to each spring by a fastening 11. This circumferential holding member is preferably secured to the inside faces of the spring members 3, and as seen in Fig. 2, is provided with suitable adjustment means for adapting the core to the inner circumference of the tire casing. The adjustment means shown includes an adjusting screw 12 engaging in threaded openings in the inturned arms 13 and 14 provided respectively at the opposite ends of the strip. In order to brace and maintain the connecting ends of the strip 10 in proper registering relation, and at the same time provide a joint which will not easily wear through the tread of the casing, the said arm 13 is provided with a beveled extension 15 which slidably engages with the outerside of the end of the strip 10 adjacent the arm 14. Accordingly, though the spring members 3 are rigidly connected and spaced from each other, it is possible to adjust the circumference of the entire core, by means of the screw 12 so that it will fully and snugly fit to the tire.

Another novel and important feature of the invention resides in the provision of means for placing all of the spring members 3 under tension, to thus laterally fill out the entire casing and at the same time distribute the weight imposed on the wheel to all of the springs. This feature is provided for by the expansible split pressure ring 16 which extends throughout the circular core unit, and loosely engages with the individual spring members 3 by passing through the eyes 7 thereof.

It will thus be apparent that when the ends of the split ring are forced apart, the entire ring will be expanded to thereby place all of the spring members under the desired pressure. The expansion of this split pressure ring may be effected in any suitable manner after the whole tire is placed upon the wheel. Referring to the means shown in the drawings for accomplishing that result, it will be observed from Figs. 2 and 4 that the opposite free ends of the ring 16 may be pivotally connected, by means of the expanding links 17, with a rotatable tension disk 18, rigidly connected to one end of an operating stem 20 extending vertically through an opening 21 common to both the wheel felly F and rim R. To provide for the positioning of the links 17 in correct relation to the ends of the split ring 16, the operating stem 20 is provided with an enlarged bearing boss 22, clearly shown in Fig. 2, while the shank of the operating stem is threaded as at 23 and provided at its inner end with an exteriorly accessible tool engaging portion 24.

In order to maintain the disk 18 in the desired adjusted position, it will be apparent that some locking means are required whereby the stem 20 will not turn after the adjustment has been made. While any desired expedient may be adopted for accomplishing this purpose, there is suggested in the drawings a round nut member 25 having a threaded engagement with the threaded shank 23 of the stem 20, and provided with a vertical opening for receiving a pin 25ᵃ which will lock the nut to the wheel felly F. The inner face of this nut may be provided with a plurality of radial notches 26 for receiving a pin 27 which extends transversely through the shank 23. Therefore, when it is desired to make the adjustment, the pin 27 can be withdrawn from the shank of the stem and the latter rotated the desired amount, and then the pin reinserted so that the opposite ends thereof projecting beyond the sides of the stem will register in a notch 26. In employing this means for preventing the rotation of the stem 20 after the adjustment thereof has been effected, the nut member 25, may be conveniently provided with external threads 28 for receiving the internal threaded end 29 of the closure cap 30.

Accordingly, it will be apparent from the foregoing, that the operating stem 20 may be easily turned through an arc of a circle to turn the tension disk, and thus cause the expanding links 17 to move in opposite directions to force the ends of the pressure ring apart and place the same under tension, thereby distributing an equal amount of pressure to all the spring members 3. These expanding links 17 are preferably pivotally connected to the disk at diametrically opposite points, and are so arranged that when the disk is rotated in the direction of the arrow shown in Fig. 4, they will move in opposite directions to force the ends of the split ring apart. If, under continual use, the pressure on the expanding ring becomes lessened, it will be obvious that the cap 30 may be removed from the operating stem, and the latter easily turned to replace the ring under the desired tension, in a convenient manner without having to remove the whole tire from the wheel.

Without further description, it is thought that the many features and advantages of the present invention will be readily apparent, and it will also be understood that changes in the form, proportion, and minor details of construction may be resorted to without departing from the spirit of the invention or scope of the appended claims.

I claim:

1. A resilient tire including a tire casing, and an internal spring core unit comprising a circular series of spaced transversely disposed spring members each having an outer arched portion and an inner introverted portion, an adjustable circumferential connector rigidly connected with the outer arched portion of all of the spring members, and an expansible pressure ring connected with the said introverted portions of all of the spring members.

2. A resilient tire including a casing, and an internal spring core unit comprising a plurality of spaced transversely disposed spring members, said members each having an arched portion and introverted end portions opposite the said arched portion, a circumferential holding strip for spacing said springs, said strip being rigidly connected with the inner side of the arched portion of each spring member, and an expansible ring connected with the said introverted ends of each member.

3. A resilient tire including a casing, and an internal spring core unit comprising a plurality of spaced transversely disposed spring members each having an outer arched portion and an inner introverted portion formed with an eye, a circumferential holding strip rigidly connected with the arched portion of the spring members and having adjustment means, and a pressure ring passing through the eyes of the spring members and having expansible tension means.

4. A resilient tire including a tire casing, and an internal spring core unit comprising a plurality of spaced transversely disposed spring members each having an arched outer portion and an introverted inner portion having an eye, a circumferential holding strip for connecting the arched portion of each spring member, a pressure ring passing through the eye of each spring member, and means for placing said ring under tension including a disk having link connections with the ends of said ring, and an externally exposed operating stem.

5. A resilient tire including a tire casing, and an internal spring core unit comprising a plurality of spaced transversely disposed spring members each having an outer arched portion and an introverted inner portion having an eye, a circumferential holding strip for uniting the arched portions of the spring members and having adjustment means, a pressure ring passing through the eye of each spring member, and means for placing said ring under tension including a disk, links pivotally connected with said disk and the free ends of said ring, an operating stem rigidly carried by said disk and extending to an exposed position, and means for locking said stem in adjusted position.

In testimony whereof I hereunto affix my signature in the presence of two witnesses.

LOUIS E. KRICHBAUM.

Witnesses:
 AGNES A. JOHNSTON,
 HORACE A. SMITH.

Copies of this patent may be obtained for five cents each, by addressing the "Commissioner of Patents, Washington, D. C."